Aug. 20, 1935.   O. H. HANSEN   2,011,631
PROCESS OF HEAT TREATING
Filed May 2, 1931   2 Sheets-Sheet 2
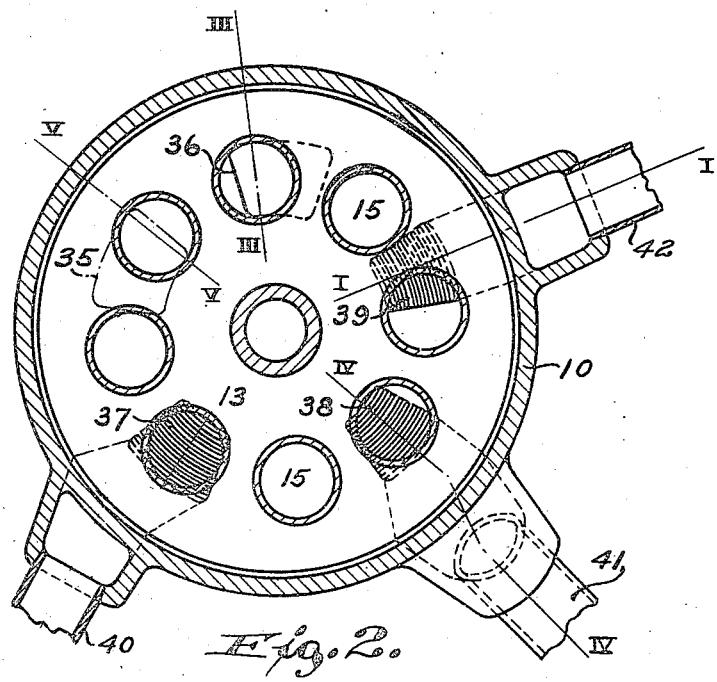
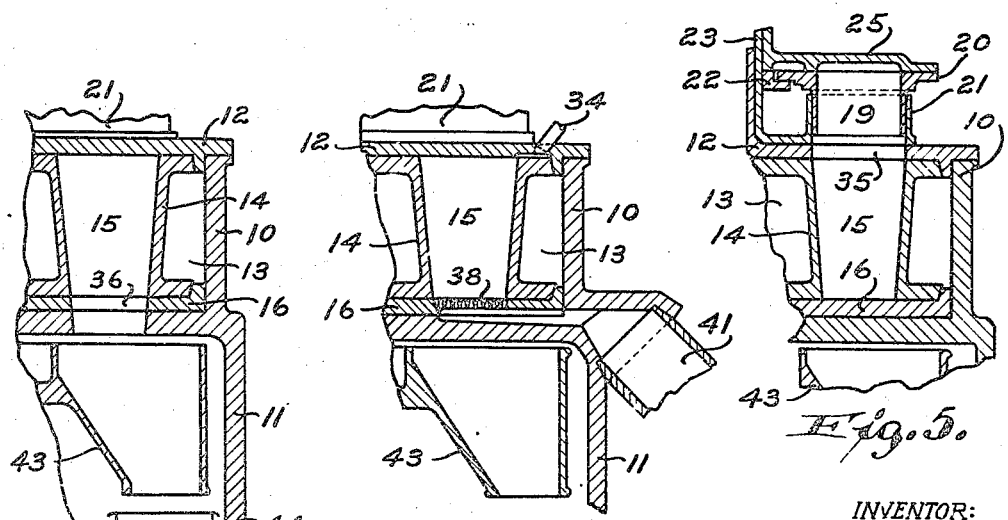
INVENTOR:
O. H. Hansen
BY
Morsell & Morsell
ATTORNEYS.

Patented Aug. 20, 1935

2,011,631

UNITED STATES PATENT OFFICE 2,011,631

PROCESS OF HEAT TREATING

Oswald H. Hansen, Cedarburg, Wis.

Application May 2, 1931, Serial No. 534,550

12 Claims. (Cl. 99—8)

The present invention relates generally to improvements in the art of preserving foods, and relates more specifically to an improved process of heat treating edible substances in order to sterilize and permanently preserve the same.

A general object of the invention is to provide an improved process of quickly, effectively and automatically heat treating various classes of edible substances or foods, in order to prevent spoilage thereof and to permanently preserve the same.

Numerous methods of heat treating edible substances in order to preserve the same by destroying destructive micro-organisms in the product, have heretofore been proposed and utilized, but none of these prior methods have proven satisfactory for the treatment of certain classes of foods. In order to successfully and commercially sterilize certain classes of foods such as green peas, beans, whole grain corn, and the like, it is requisite to heat treat the same quickly and effectively and without deteriorating the product, either before or after the commodity has been packed in its final containers.

As disclosed in Patent No. 1,563,971, it has heretofore been suggested to sterilize food products after batches thereof are placed in the cans, by first producing a partial vacuum in each can and by subsequently injecting live steam and sealing the cans, it being intended to have the vacuum assist the steam in permeating through the contents of the sealed containers. This prior process is, however, impracticable for the treatment of all foods because it is not feasible to inject enough steam to insure complete sterilization, and also because the steam at high temperature may scorch or burn the commodity.

As disclosed in Patent No. 1,756,550, it has also been proposed to heat treat food products, by admitting to the voids of pre-heated solids or granular material, a heated fluid containing sufficient heat units to effectively sterilize the mixture which is subsequently packed in the final containers. While this process is readily and effectively applicable in the treatment of some food products, it cannot be applied without modification, to the treatment of others. Some products are so delicate, that if they are subjected to heat sufficiently high to produce complete sterilization within a desirably short period of time, while subjected to low external pressure, the granules will burst due to excessive internal pressures created during heating thereof. In accordance with this prior process, it is also contemplated to maintain the final product immersed in the initial heating fluid, and this is also frequently objectionable as it destroys the natural appearance and taste of the commodity.

As disclosed in Patent No. 1,857,450, it has, moreover, been proposed to obviate the danger of bursting of the granules when heat treated in accordance with the method set forth in Patent No. 1,756,550, by admitting the heating medium to the voids of the solids or granular materials, while the latter are maintained under sufficiently high external pressure to prevent such destructive bursting. This treatment of the substance may be effected either before or after the same has been placed in containers, and insures effective and uniform sterilization of the product.

The present invention contemplates provision of new and useful improvements in the latter of the above-described processes, whereby certain classes of food products may be more effectively treated and the natural appearance and taste thereof maintained without dry packing of the commodity.

Another specific object of the invention is to provide an improved process of quickly and effectively reducing the temperature of food products after sterilization thereof in a heating medium which has subsequently been removed so as to leave the products in highly heated condition.

While the improved process of heat treating is especially applicable for effective processing of only certain classes of material, the invention besides saving labor and eliminating can losses, enables embodiment in a single machine unit of practically all of the numerous machines now utilized in a canning factory, thereby reducing the canning plant to its simplest form.

The above and other objects and advantages attainable with the present invention will be apparent from the following detailed description, and the novel features of sterilization disclosed but not specifically claimed herein, form the subject of Patent No. 1,857,450, of which the present application is a continuation in part.

A clear conception of the several steps constituting the present improved process, and of one embodiment of apparatus for commercially exploiting the process, may be had by referring to the drawings accompanying and forming a part of this specification, in which like reference characters designate the same or similar parts in the various views.

Fig. 2 is a transverse section through the device of Fig. 1, taken along the line II—II of Fig. 1;

Fig. 3 is a fragmentary vertical section through the device, taken along the line III—III of Fig. 2;

Fig. 4 is a fragmentary vertical section through the device, taken along the line IV—IV of Fig. 2; and Fig. 5 is a fragmentary vertical section through the device, taken along the line V—V of Fig. 2.

Figure 1:
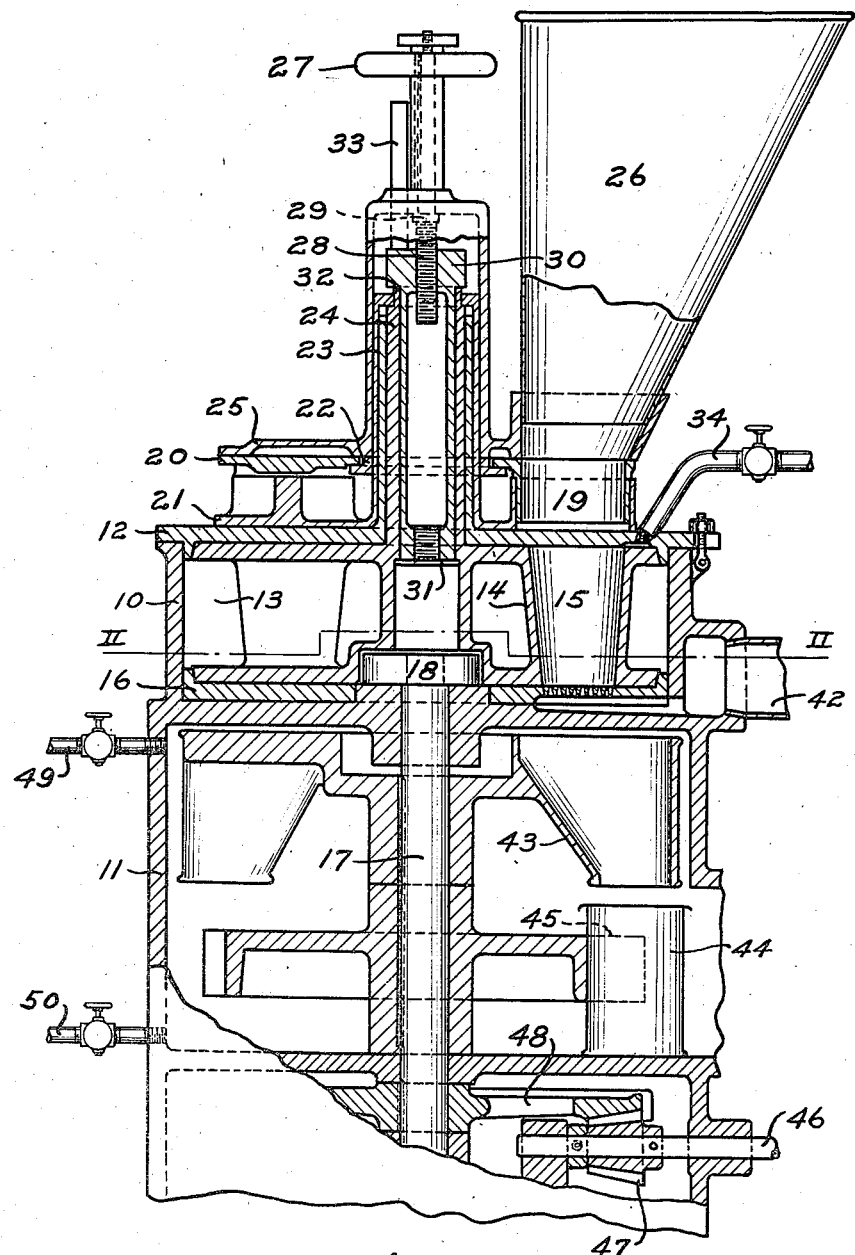
Fig. 1 is a central vertical section through a combined granular material measuring, feeding and sterilizing device for delivering pre-measured batches of granular material mixed with liquid, to successive cans of a series.

In accordance with the present improvement, solid or granular material is sterilized either in bulk or in batches, by first immersing the same under relatively high temperature and pressure in a heated liquid containing sufficient heat units to effectively sterilize the solids or granules. The heating liquid is applied at a temperature sufficiently high to completely sterilize the solid or granular material and above the normal boiling point of the liquid, and when immersion is being effected, the substances are preferably maintained under sufficient pressure to prevent actual boiling of the liquid. After sufficient heat has been applied to and absorbed by the solid material or granules, the liquid is removed and the heated solids are subsequently mixed with other previously sterilized liquid to thereby initially cool the solids. The mixture of liquid and solids is subsequently packed while maintained under relatively high pressure, in receptacles such as tin cans, with the aid of cap applying and closing machinery associated with the measuring and sterilizing apparatus in a manner similar to that disclosed in said Patent No. 1,857,450. The hermetically sealed mixture is then permitted to finally cool, thus completing the processing operation.

While the improved process will be described herein as specifically applied to the treatment of successive batches of granular material, the improvement is more generally applicable to the treatment of food commodities in bulk. It is desirable, in all cases, to gradually relieve the pressure on the granular material so as to prevent destruction of the granules.

Referring to the drawings, the combined measuring, feeding and sterilizing device shown therein, is adapted for use in conjunction with cap applying and closing mechanism, such as shown in said prior application Serial No. 511,663, and comprises in general a housing 10 formed integral with a lower casing 11, and having a removable top closure 12 coacting therewith to form a sealed chamber 13. A rotor 14 having an annular series of pockets 15 formed therein, is revoluble within the chamber 13 upon a lower fixed bearing plate 16, the top of the rotor snugly engaging the lower portion of the closure 12. The rotor 14 is freely vertically removable from the chamber 13 upon removal of the top closure 12, and is rotatable directly by means of a main vertical drive shaft 17 having a driving head 18 at its upper end coacting with a socket formed in the lower central portion of the rotor 14.

An annular series of granular measuring pockets 19 of variable volume, are formed in relatively adjustable upper and lower members 20, 21, the lower of which rests directly upon and is rotatable relatively to the fixed closure 12, these measuring pockets 19 always being disposed in vertical alinement with the corresponding mixing and sterilizing pockets 15 located therebelow.

The upper member 20 of the set which forms the pockets 19, is rotatably supported upon a non-rotary adjusting ring 22, and the lower member 21 has an integral sleeve 23 which is detachably but drivingly connected to the upper end of a sleeve 24 formed integral with the rotor 14. A non-rotary but vertically adjustable top plate 25 to which the adjusting ring 22 is attached, coacts with the upper member 20 and provides a support for the granular material supply hopper 26. The top plate 25, ring 22 and upper member 20 are simultaneously vertically adjustable relative to the lower member 21, by means of a hand wheel 27 and screw 28.

The hub of the hand wheel 27 rests directly upon the upper extension of the top plate 25, and the screw 28 which is keyed to the hand wheel hub, has a collar 29 reacting against a lower surface of the plate extension, and also has a threaded lower end coacting with a central non-rotary element 30. The element 30 is fixed against vertical displacement relative to the rotor 14, by means of a screw plug 31 at the lower end of this element, and a shoulder 32 at the upper end thereof coacts with the upper end of the sleeve 24 which is formed integral with the rotor 14. A pin 33 rigidly attached to the element 30, passes through a hole in the upper extension of the plate 25, thus preventing relative rotation of the element 30 and plate 25, while permitting free vertical movement of the plate 25 and of the elements carried thereby in order to vary the volumes of the pockets 19. The plate 25 and the element 30, may be anchored against rotation in any suitable manner in order to prevent lateral displacement of the hopper 26.

The chamber 13 and pockets 15 may be supplied with steam under pressure and at any desired temperature, by means of one or more steam inlet pipes 34 having control valves therein, these pipes communicating with the chamber 13 remote from the opening 35 in the closure plate 12 through which the measured batches of granular material are adapted to be delivered by gravity into the corresponding pockets 15 located therebeneath. The bearing plate 16 is provided with a discharge opening 36 which is adapted to deliver the successive sterilized batches of material from the pockets 15 to the chamber within the lower casing 11. The bearing plate 16 also has a succession of openings or slots 37, 38, 39 therein as shown in Figs. 1, 2 and 4. The slots 37 communicate directly with a heated liquid supply pipe 40 for delivering the sterilizing liquid upwardly through the batches of granular material in the successive pockets 15. The slots 38 communicate directly with a drain pipe 41 for automatically removing the heating liquid from the granular material in the pockets 15, after the granules have absorbed sufficient heat for sterilization purposes. The slots 39 communicate directly with a sterile liquid supply pipe 42 for delivering relatively cool pre-sterilized liquid to the successive batches of granular material prior to delivery thereof to the cans.

Located within the lower casing 11, is a series of funnels 43, these funnels being revoluble with the main shaft 17 and being disposed directly beneath and in vertical alinement with the pockets 15. A series of can hooks 45 is also secured to the drive shaft 17 below the funnels 43, these hooks being adapted to position and to convey the successive cans 44 beneath and in vertical alinement with the funnels 43. The main vertical drive shaft 17 is capable of being driven from a power shaft 46 through a pinion 47 and gear 48 located beneath the bottom of the casing 11, and steam or other heating medium, may be delivered to and from the interior of the casing 11 through valve controlled pipes 49, 50 as illustrated in Fig. 1. The mechanism for subsequently transporting the cans 44 to the capping or closing mechanism and to the final cooler, is fully disclosed in the said Patent No. 1,857,450, and need not be specifically described herein.

During normal operation of the improved sterilizer in order to effect commercial exploitation of the new process, the granular material which is to be heat treated, is delivered in bulk to the supply hopper 26 and steam at the proper temperature and pressure is supplied to the interior of the casing 11 and housing 10 through the pipes 49, 34, thereby maintaining the chamber 12 and the interior of the casing 11 under high pressure and temperature, at all times. The main shaft 17 is being rotated to simultaneously revolve the can hooks 45, funnels 43, rotor 14 and members 20, 21, thus transporting the successive cans 44 and funnels 43 beneath the discharge opening 36 and also causing the successive measuring pockets 19 to receive measured batches of granular material from the stationary hopper 26. As the pockets 19 are filled, they are advanced between the top plate 25 and the closure 12, being automatically sealed from the atmosphere, after which the successive measured batches are deposited in the pockets 15 located therebelow, through the opening 35 in the closure 12. In the pockets 15, the granular material is subjected to high pressure and temperature whereupon the batches are carried over the slots 37 at which time heating liquid under high pressure and temperature is delivered upwardly through each charge from the pipe 40. The pockets 15 substantially filled with mixture of heated liquid and granules, are then advanced until the slots 38 are reached, whereupon the heating liquid will have transferred sufficient heat units to the granules to insure complete sterilization thereof, and the liquid will be delivered from the pockets 15 through the drain pipe 41. The batches of heated solids are next transferred to the slots 39 whereupon previously sterilized liquid is admitted to each pocket 15 and is mixed with the granular material therein.

The successive heat treated batches of mixture are subsequently delivered in succession through the opening 36 to the successive cans 44 which are likewise located in a zone of high pressure and temperature, and the cans 44 are thereafter hermetically sealed and conveyed into a final cooling zone of gradually diminishing temperature and pressure wherein the confined charges are finally cooled. During such cooling of the batches, the pressure and temperature thereof is simultaneously reduced to normal.

By utilizing liquid at a temperature sufficient to sterilize the food product and above the normal boiling point and subjected to pressure sufficient to prevent boiling, as a heating medium, the temperature of the liquid may be maintained sufficiently high to insure rapid and complete sterilization of the solids, without danger of scorching or burning the latter. The heating medium not only sterilizes the granules, but injects sufficient heat units therein to insure complete sterilization of all portions of the product. The initial heating medium may be ordinary water, brine or other liquid, and may be utilized to heat treat successive batches of granular material. The liquid which is finally added to the heated batches of granular material for cooling purposes, may be brine, syrup or other liquid which has been previously sterilized and purified, so as to maintain the final batches in natural condition as to appearance and taste. By maintaining the heated granular material under high pressure from the time the same is initially heated until after the cooling liquid has been mixed therewith, danger of degradation is eliminated, and absolutely sterile final batches are insured. This process is especially applicable to materials which it is desired to finally pack in liquid, and is not intended for use when dry packing is desired.

The degree of pressure and temperature maintained within the enclosures, may be regulated to suit the particular commodity being treated, by means of valves in the pipes 34, 49, and any desired number of these pipes may obviously be provided. If necessary, the pockets 15 may also be provided with vents for permitting unrestrained ingress of the entering liquid thereto, although such vents may be dispensed with if it is not desired to have the pockets 15 completely filled with mixture. The entire machine when once properly adjusted, operates automatically, and the volumes of the batches of granular material contained in each batch of final mixture, may be quickly varied either while the machine is operating or when it is stopped, thereby permitting packing of various sized cans 44, and also permitting variation in the proportions of the mixture. The machine may also be readily assembled and dismantled for inspection and cleaning, by virtue of the removability of the top closure 12.

It should be understood that it is not desired to limit the present invention to the exact details of construction of the machine or to the precise steps of the method, herein shown and described, for various modifications within the scope of the claims may occur to persons skilled in the art.

It is claimed and desired to secure by Letters Patent:

1. The process of sterilizing, which comprises, mixing with solids a liquid containing sufficient heat units to completely sterilize the solids, removing the liquid from the hot solids after sufficient heat units have been transferred to effect complete sterilization of the solids, and adding sterile cooling liquid to the hot solids.

2. The process of sterilizing, which comprises, mixing with granular material a liquid containing sufficient heat units to sterilize the granules while the latter are subjected to high external pressure, removing the liquid after equalization of the temperature of the mixture and while the same is still heated, adding sterile liquid to the heated granular material, and finally hermetically sealing the mixture.

3. The process of sterilizing, which comprises, mixing with granular material a liquid containing sufficient heat units to sterilize the granules while the latter are subjected to high external pressure, removing the liquid from the granular material after sufficient heat units have been transferred to completely sterilize the granules, and adding sterile cooling liquid to the heated granules while under pressure.

4. The process of sterilizing, which comprises, immersing successive batches of granular material in highly heated liquid while under high pressure and temperature sufficiently high to effect complete sterilization, removing the granular material from the liquid while in heated condition, adding sterile liquid to the hot granular material, and hermetically sealing the successive batches of heated granules.

5. The process of sterilizing, which comprises, immersing successive batches of granular material in hot liquid heated to a temperature sufficient to sterilize the granular material and above the normal boiling point of the liquid and subjected to pressure sufficient to prevent boiling of the latter, removing the granular material from the liquid while heated, partially cooling the heated material by adding sterile liquid thereto, hermetically sealing the successive batches of mixture, and allowing the sealed batches to further cool.

6. The process of sterilizing, which comprises, filling the voids of successive batches of granular material with liquid sufficiently hot to effect complete sterilization of the granules, removing the liquid from the said voids while the granules are heated and subjected to relatively high external pressure, adding other liquid to the heated granules under pressure, and hermetically sealing the batches of mixture while subjected to said high pressure and thereafter allowing the same to finally cool.

7. The process of sterilizing, which comprises, rendering a food product sterile by causing the same to contact directly with a liquid heated to a temperature sufficient to sterilize the product and above its normal boiling point and subjected to pressure sufficient to prevent boiling, replacing the heating liquid with other sterile liquid, and sealing the heat treated mixture of product and other liquid in a container.

8. The process of sterilizing, which comprises, rendering a food product sterile by mixing directly therewith a liquid heated to a temperature sufficient to sterilize the product and subjected to a pressure sufficient to prevent boiling, replacing the heating liquid with other sterile liquid, and sealing the sterile mixture in a container.

9. The process of sterilizing, which comprises, rendering a food product sterile by mixing therewith a liquid heated to a temperature sufficient to sterilize the product and subjected to a pressure sufficient to prevent boiling, replacing the heating liquid with other sterile liquid, and sealing the sterile mixture in a container while subjected to high pressure.

10. The process of sterilizing, which comprises, rendering a food product sterile by mixing therewith a liquid heated above its normal boiling point to a temperature sufficient to sterilize the product and subjected to a pressure sufficient to prevent boiling, removing heating liquid from the mixture and replacing the removed liquid with other sterile material, and sealing the final product in a container.

11. The process of sterilizing, which comprises, rendering granular material sterile by mixing it with liquid and subjecting the material to a temperature sufficiently high to sterilize the same while the mixture is subjected to pressure sufficient to prevent boiling of the liquid, separating the liquid from the sterile granular material while the latter is maintained under pressure, and adding sterile cooling material to the sterile removed granular material.

12. The process of sterilizing, which comprises, rendering granular material sterile by mixing it with liquid and subjecting the material to a temperature sufficiently high to sterilize the same while the mixture is subjected to pressure sufficient to prevent boiling of the liquid, separating the liquid from the sterile granular material while the latter is maintained under pressure, and adding sterile cooling liquid to the hot sterile granular material to produce a sterile final mixture.

OSWALD H. HANSEN.